United States Patent [19]

Caldwell

[11] 4,048,640
[45] Sept. 13, 1977

[54] INK PEN CARTRIDGE AND MOUNTING ARM FOR A RECORDING INSTRUMENT

[75] Inventor: Bruce J. Caldwell, Conroe, Tex.

[73] Assignee: Tejas Instrument Engineers, Inc., Spring, Tex.

[21] Appl. No.: 742,397

[22] Filed: Nov. 15, 1976

[51] Int. Cl.² ............................................. G01D 15/16
[52] U.S. Cl. ................................................. 346/140 A
[58] Field of Search .................................... 346/140 A

[56] References Cited

U.S. PATENT DOCUMENTS

| | | | |
|---|---|---|---|
| 2,216,248 | 10/1940 | Moore | 346/140 A |
| 3,611,430 | 10/1971 | Watchorn et al. | 346/140 A |
| 3,893,130 | 7/1975 | Browning et al. | 346/140 A |
| 3,934,255 | 1/1976 | Taylor | 346/140 A |

*Primary Examiner*—George H. Miller, Jr.
*Attorney, Agent, or Firm*—Fulbright & Jaworski

[57] ABSTRACT

An ink pen cartridge supported from a mounting arm for use on a recording instrument in which the attachment between the cartridge and mounting arm provides a secure and positive connection which accurately positions the ink cartridge thereby avoiding recalibration of the recorder when the ink in the cartridge is depleted necessitating a replacement with a filled cartridge. The exterior of the cartridge body is free of external arm connections and the arm is connected to the end of the cartridge to avoid interference between passing cartridges when mounted to multiple pen recorders. In addition, the ink cartridge has multiple connections in one end for optional attachment to a mounting arm whereby adjacent pens in multiple pen recorders may be more advantageously spaced, relative each to the other. The ink cartridge normally sealingly holds ink in the body, but the attachment of a mounting arm to the cartridge opens an air vent to the cartridge body for allowing flow of ink from the body.

14 Claims, 9 Drawing Figures

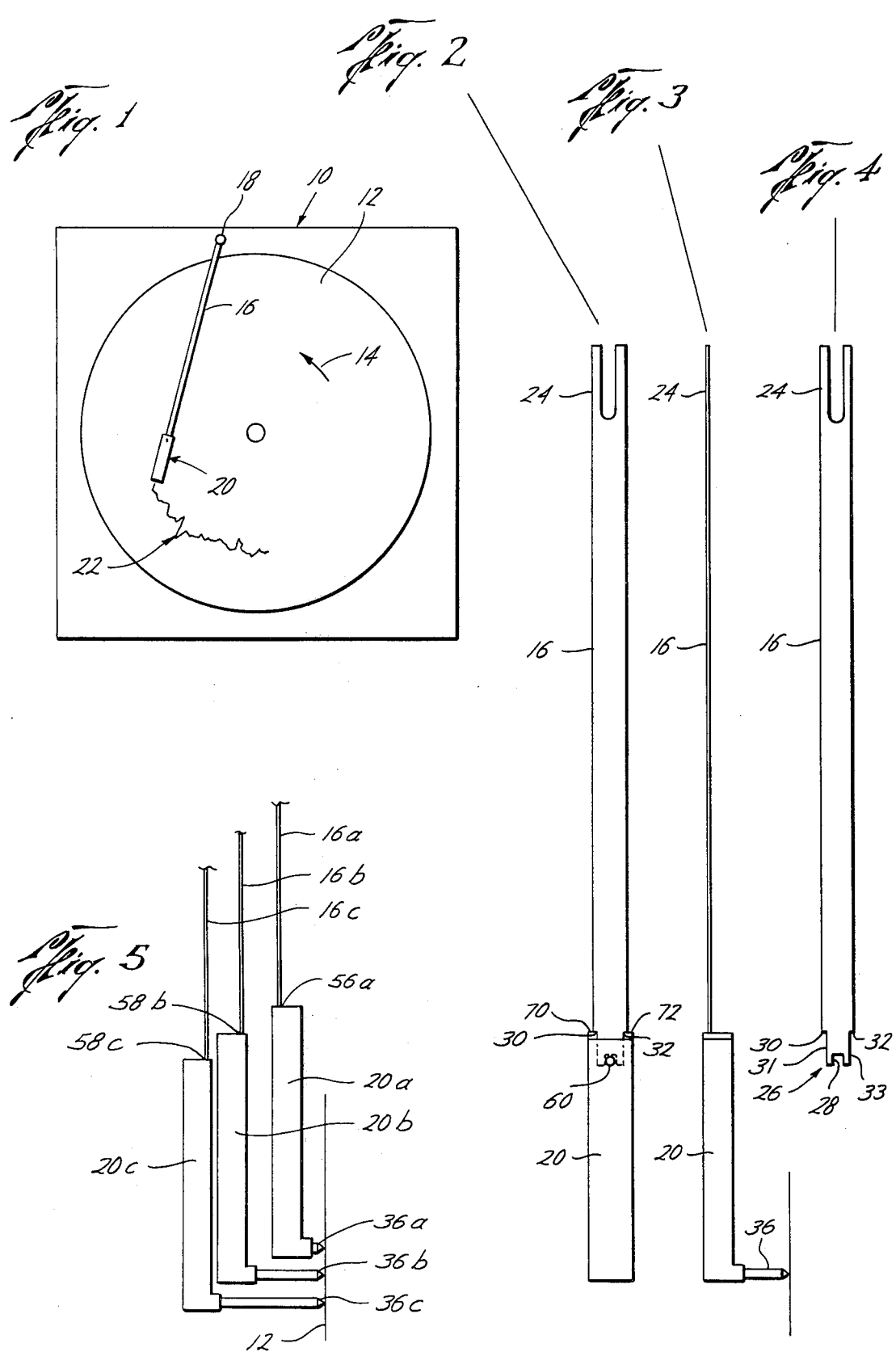

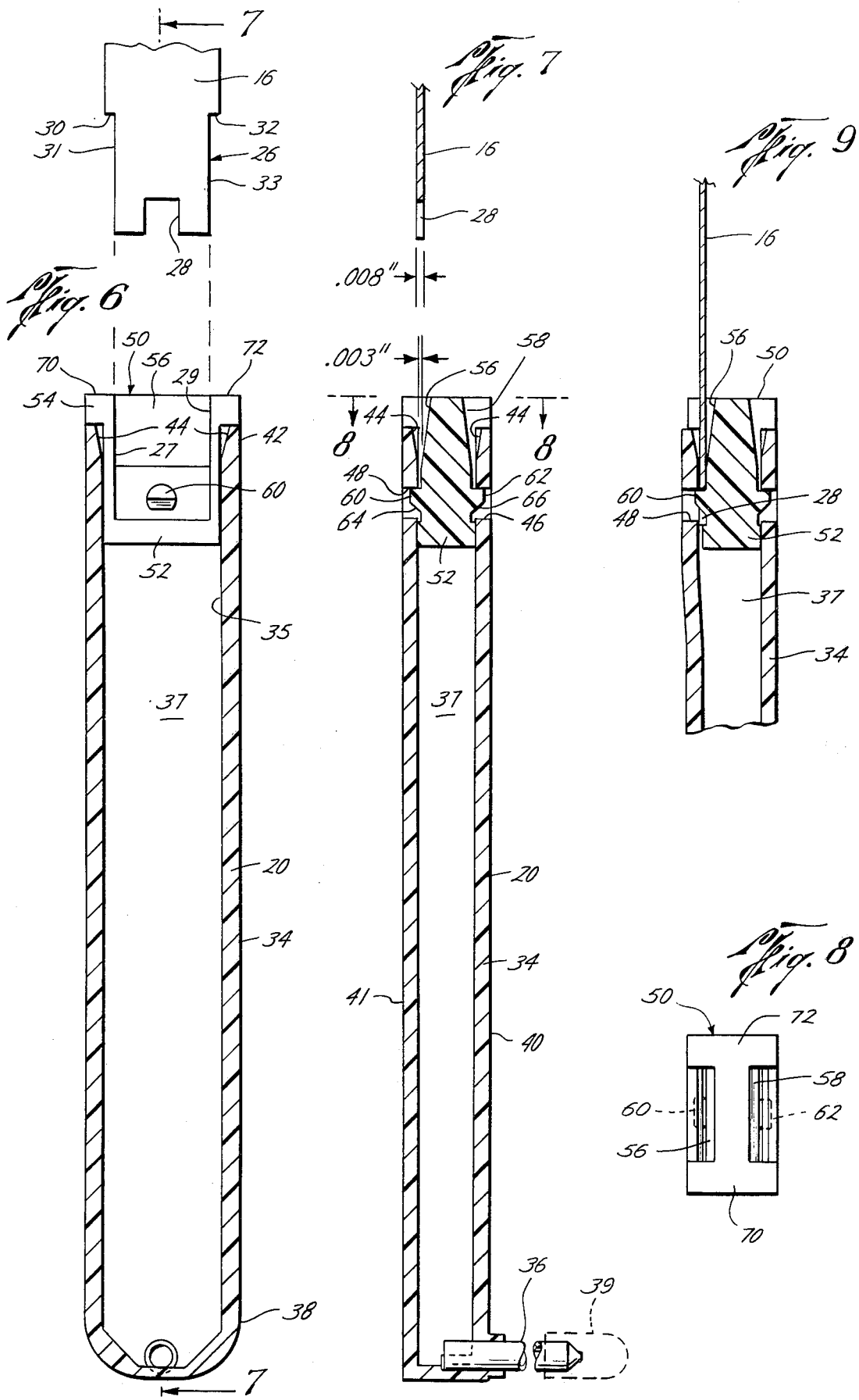

4,048,640

INK PEN CARTRIDGE AND MOUNTING ARM FOR A RECORDING INSTRUMENT

BACKGROUND OF THE INVENTION

In typical recorders, a disposable ink cartridge is attached to a mounting arm which is in turn connected to the recorder for recording conventional measurements. The end of the mounting arm which is attached to the recorder may vary depending upon the type of recorder. However, the mounting arm once attached to the recorder generally remains in place and ink cartridges are attached and removed from the free end of the mounting arm as required. The ink cartridges are generally disposable and replaceable. However, it is important that when an ink cartridge is replaced that the new cartridge be placed securely and accurately in the same position as the previous cartridge in order to maintain the calibration of the recorder. Also, in the past with the use of multiple pens on a recorder, the ink cartridges have been found to interfere with each other during their movement, particularly when one pen cartridge passes by another pen cartridge.

In typical recorders, a disposable cartridge is permanently sealed and supports an ink nib composed of fibrous materials, where the nib is intended to both transport ink from the cartridge chamber and allow induction of air in a reverse direction to prevent formation of a partial vacuum within the cartridge chamber above the ink supply. Air is normally entrained through the sidewalls of the fibrous nib until such time as the ink dries on the surface of the nib shank to no longer allow entry of make-up air. At this time a partial vacuum is induced in the ink cartridge body and prevents continuing flow of ink to a chart.

The present invention is directed to various improvements in an ink pen cartridge for a recorder and its connection to a mounting arm.

SUMMARY

The present invention is directed to an improved ink pen cartridge in which a positive and accurate connection is made between the cartridge and a mounting arm to insure accurate placement of the cartridge on a recording instrument and to avoid the need for calibration of the recorder each time a cartridge is changed.

Another feature of the present invention is the provision of a connection between an ink cartridge and a mounting arm in which the arm engages the end of the cartridge thereby avoiding the need for external connections such as cleats on sides of the cartridge which would interfere in a multiple pen recorder with multiple pen spacing or passage. Furthermore, it is preferred that the ink cartridge has two engaging connections for receiving a mounting arm for optionally arranging spacing between adjacent pen cartridges.

Yet a further object of the present invention is the provision of an ink cartridge having a hollow body with a normally closed air vent for holding ink, in which the air vent is only opened upon connection of the ink cartridge to the mounting arm.

Yet a still further object is the provision of an ink pen cartridge for attachment to a mounting arm in which the cartridge includes a hollow body for holding ink with a pen adjacent one end of the body. An opening is provided preferably in two sides of the body adjacent to but spaced from the second end of the body. A cap is insertable in the second end of the body and includes a first end sized and shaped to coact with the interior of the body to normally seal the inside of the body for holding ink in the cartridge body. The cap includes a post extending outwardly from each side of the cap for extending into one of the body openings for locking the cap in the cartridge body. In addition, the cap includes a longitudinal recess, preferably on two sides, for receiving one end of a mounting arm. The recesses extend from the second end of the cap towards the first end of the cap and decrease in thickness from the second end whereby when a mounting arm is inserted into one of the recesses the arm is securely wedged therein and in addition the arm separates the cartridge body from the first end of the cap to provide an air vent from the cartridge body through one of the openings. The second end of the cap is larger than the interior of the cartridge body for abutting the second end of the cartridge body when the cap is positioned in the body, and the second end of the cap also includes an outwardly facing shoulder on each side of the recesses for coacting with shoulders on a mounting arm for accurately aligning the body relative to the mounting arm.

Yet a further object of the present invention is the provision of a mounting arm for supporting the ink pen cartridge. The mounting arm includes an elongate arm having first and second ends. The first end is shaped for attachment to a recorder. The second end is generally rectangular in cross section and sized for insertion into a recess in the end of the cartridge and the second end includes a notch for engagement with a post of the cartridge which acts to align the cartridge in the mounting arm in both a longitudinal and transverse direction. Furthermore, a stop shoulder is provided on each edge of the second end of the mounting arm for coaction with a shoulder on the end of the cartridge for providing a positive positioning of the ink pen cartridge on the mounting arm.

Other and further objects, features and advantages will be apparent from the following description of a presently preferred embodiment of the invention, given for the purpose of disclosure, and taken in conjunction with the accompanying drawings.

BRIEF DESCRIPTION OF THE DRAWINGS

FIG. 1 is an elevational view of a conventional recording instrument utilizing the ink pen cartridge and mounting arm of the present invention, FIG. 2 is an enlarged elevational view of the ink pen cartridge and mounting arm of the present invention, FIG. 3 is a side elevational view of the apparatus of FIG. 2, FIG. 4 is an elevational view of the mounting arm of the present invention, FIG. 5 is a fragmentary elevational view illustrating the interaction between a plurality of ink pen cartridges on a multi-pen recorder, FIG. 6 is an enlarged exploded fragmentary cross-sectional view illustrating the coacting ends of the mounting arm and the ink pen cartridge of the present invention, FIG. 7 is a view taken along the line 7—7 of FIG. 6, FIG. 8 is a view taken along the line 8—8 of FIG. 7, and FIG. 9 is a fragmentary elevational view in cross section of the structure of FIG. 7 shown in the connected position.

DESCRIPTION OF THE PREFERRED EMBODIMENT

Referring now to the drawings, and particularly to FIG. 1, the present invention will be described as used with a conventional recorder 10 having a circular type chart 12 which rotates in the direction indicated by the arrow 14. However, the present invention may also be used with other types of charts such as strip or roll types. A mounting arm 16 is provided connected to the recorder 10 by a connection 18 and in turn supports an ink pen cartridge 20 which records a graph 22 on the chart 12 in response to some property being measured such as pressure or temperature. When the ink pen cartridge 20 becomes low on ink, it is removed from the mounting arm 16 and replaced with a new cartridge 20. Normally, the mounting arm 16 need not be replaced so long as it is adapted to be connected to the new cartridge 20. However, it is important that the new cartridge 20 be attached to the mounting arm 16 in a way which holds the cartridge 20 secure and in the same position as the previous cartridge 20 in order to avoid having to recalibrate the recorder 10 each time an ink cartridge 20 is replaced.

Referring now to FIGS. 2, 3 and 4, the mounting arm 16 is best seen. The arm 16 includes a first end 24 in which the end is distinctively contoured in shape and size to fit a particular type of recorder. The type of end 24 shown in FIGS. 2, 3 and 4 is a common one which will generally fit Barton, Bristol, Nolte, Meriam, I.I.C., Tejas and other type recorders. Dissimilar types of ends 24 are used for other types of recorders. The mounting arm 16 has a second end generally indicated by the reference numeral 26 which coacts with and attaches to the ink cartridge 20. It is important that the end 26 securely and accurately position and hold the cartridge 20 in proper alignment and position in order to insure that the graph 22 on the chart 12 is not distorted by the positioning of cartridge 20. The second end 26 is generally rectangular in cross section, and generally includes for engagement with the cartridge 20 a notch 28 and a stop shoulder 30 and 32 on opposite edges 31 and 33 as will be more fully discussed hereinafter.

The ink pen cartridge 20, as best seen in FIGS. 2, 3, 6 and 7, includes a body 34 having an interior 37 for holding a matrix material and ink, and is preferably made of any suitable plastic such as a molded acetate material sold under the trademark Delrin. A pen nib 36, preferably a conventional non-fibrous plastic nib, is connected to the body adjacent the first end or bottom 38 and extends from one of the sides such as the side 40. The body 34 includes one and preferably two openings, such as opening 46 in side 40, and an opening 48 in another side 41. The second end or top 42 of the body 34 preferably includes tapering interior sides 44 for ease of inserting a cap, generally indicated by the reference numeral 50, into the second end or top 42. The cap includes a first end 52 which is shaped and sized to coact with the insides 35, which are preferably slightly tapered, of the body 34 to normally seal against the insides 35 for holding ink in the chamber 37.

The cap 50 has a second end 54 larger than the interior 37 of the cartridge body 34 for abutting the second end 42 of the cartridge body 34 when the cap 50 is inserted into the inside of the body 34 for accurately aligning the cap 50 with the body 34. The cap 50 has at least one longitudinal recess, and preferably a recess 56 on one side and another recess 58 on another side, one of the recesses being on the side 41, and the other recess being on the side 40, whereby the second end 26 of a mounting arm 16 may be selectively inserted into one of the recesses 56 or 58 for attaching the ink cartridge 20 on the mounting arm 16. The recesses 56 and 58 extend from the second end 54 of the cap 50 towards, but do not extend to, the first end 52 of the cap 50 and therefore do not interfere with the sealing engagement of end 52 with the body 34. Preferably, the recesses 56 and 58 decrease in thickness from the second end 54 thereby while allowing easy entrance of the second end 26 of the mounting arm 16 into the recesses 56 or 58 and provide a tapering and gripping engagement with the end 26 of the mounting arm 16.

Preferably, a post 60 and 62 extend outwardly from the recesses 56 and 58, respectively, and as best seen in FIGS. 7 and 9, when the cap 50 is positioned in the end 42 of the cartridge body 34, the posts 60 and 62 extend into the body openings 46 and 48, respectively, for locking the cap 50 in the cartridge body 34. Preferably, the posts 60 and 62 include tapered leading edges 64 and 66, respectively, for easing the insertion of the cap 50 into the second end 42 of the cartridge body 34. As the openings 46 and 48 may also form part of an air vent, it is noted that the posts 60 and 62 do not entirely fill or block the openings 48 and 46. While the posts 60 and 62 may be omitted since the coacting surfaces between the body 34 and the cap 50 will frictionally hold the cap 50 in place, the posts insure that the cap 50 is properly positioned and the posts also coact with the arm 16 to more accurately align the cartridge 20 with the arm 16 by mating with the notch 28 in the arm 16.

The second end 54 of the cap 50 includes an outwardly facing shoulder 70 and 72 on either side of the recesses 56 and 58 which face outwardly on each side of the recesses 56 and 58 for coacting with the stop shoulders 30 and 32, respectively, on the mounting arm 16.

After the body 34 of the ink cartridge 20 is manufactured, the pen nib 36 is connected thereto and a protective cover 39 (FIG. 7) is placed over the pen nib 36 to prevent ink leaking. Ink and a matrix material are placed into the interior 37 of the body 34 and the cap 50 is inserted into the second end 42 of the body 34 with the second end 52 of the cap 50 abutting the second end 42 of the body 34. As best seen in FIG. 7, the posts 60 and 62 protrude into the openings 48 and 46, respectively, to hold the cap 50 securely in place and the first end 52 of the cap 50 seals against the inside of the body 34 for holding the ink in the interior 37 of the body 34. The ink pen cartridge 20 is then stored until ready to be used. When it is desired to attach a new ink cartridge 20 to the recorder 10, the mounting arm 16 is inserted into one of the recesses 56 and 58. As best seen in FIGS. 2, 3, 6 and 7, the second end of the mounting arm 16 firmly and securely mates and attaches to the end of the ink cartridge 20. The edges 31 and 33 of the end 26 coact with the edges 27 and 29 of the cap 50 and the stop shoulders 30 and 32 abut the outwardly facing shoulders 70 and 72, respectively, on the cap 50. In addition, the notch 28 in the end 26 of the arm 16 engages the post 60. Therefore, the ink cartridge 20 is then aligned with the mounting arm 16 in both a longitudinal and transverse direction and securely held in place by a plurality of mating surfaces and requires no recalibration.

Another feature of the present invention is best seen in FIGS. 7 and 9. From FIG. 7, it is noted that the end of the recess 56 nearest to the first end 52 of the cap 50 is shown with a typical dimension of 0.003 inches while the thickness of the mounting arm 16 is indicated as being 0.008 inches. This points out the fact that it is desirable that the first end of the recess 56 be smaller than the thickness of the arm 16. Therefore, as best seen in FIG. 9, when the end 26 of the arm 16 is inserted into the recess 56, the body 34 is separated slightly from the first end 52 of the cap 50 thereby providing an air vent from the interior 37 of the cartridge body 34 through the opening 48. That is, the ink cartridge 20 is normally sealed at each end; namely, by a cover 39 about the writing nib 36 at one end, and a plug 50 at the opposite end. Removal of the cover 39 from the nib 36 will allow ink flow in contact with the chart 12 for a limited time, until a vacuum is induced above the ink supply through usage. However, with the arm 16 attached, the plug seal 52 is lifted from its seating with the cartridge body 34 to allow inducement of air as to prevent creation of a partial vacuum within the cartridge chamber 37. As the cartridge chamber is filled with a matrix material to suspend the ink by surface tension and overcome gravity flow, ink is withdrawn by capillary attraction by a pen nib 36.

Referring now to FIG. 5, the use of the present invention in connection with a multi-pen recorder is shown in which a plurality of mounting arms 16a, 16b and 16c are connected respectively to ink cartridges 20a, 20b and 20c, which in turn have pen nibs 36a, 36b and 36c, respectively, of different lengths as is conventional. It is to be noted in FIG. 5 that the ink cartridges 20 are free of external connections and the connections of the cartridges with the mounting arm through the ends or tops of the cartridges 20a, 20b and 20c reduces the interference between adjacent cartridges 20a, 20b and 20c so that they may pass by one another readily without undesirably touching to interfere with ink trace integrity.

In addition, it is to be noted that the mounting arm 16 may be selectively connected to a cartridge 20 through either the recess 56 or the recess 58. While one of the recesses such as 58 and its coacting connections such as one of the posts 62 and one of the openings 46 may be omitted, it is preferable to provide two connections in the end or top 42 of the cartridge 20 in order to advantageously space the cartridges 20a, 20b and 20c relative to each other for lessening the possibility of interference in passing. For example, arm 16a is connected into recess 56a in cartridge 20a, but arm 16b is connected into recess 58b in cartridge 20b. Therefore, maximum spacing is provided between cartridges 20a and 20b as comparted to the spacing between cartridges 20b and 20c since arm 16c is connected to recess 58c in cartridge 20c. Since the majority of multiple pen recorders only have two pens, the use of selectively positioned recesses 56 and 58 allows maximum spacing between cartridges.

The present invention, therefore, is well adapted to carry out the objects and attain the ends and advantages mentioned as well as others inherent therein. While a presently preferred embodiment of the invention is given for the purpose of disclosure, numerous changes in the details of construction and arrangement of parts will readily suggest themselves to those skilled in the art and which are encompassed within the spirit of the invention and the scope of the appended claims.

What is claimed is:

1. An ink pen cartridge and mounting arm for a recorder comprising,
    an ink cartridge including,
        a hollow body for holding ink,
        a nib adjacent one end of the body,
        an opening in the side of the body adjacent to but spaced from the second end of the body,
        a cap insertable into the second end and into the interior of the cartridge body, said cap including a first end shaped and coacting with the interior of the body to normally seal against the inside of the body for holding ink in the body,
        a post extending outwardly from one side of the cap between the ends of the cap for extending into the body opening for locking the cap in the cartridge body,
        said cap having a second end larger than the interior of the cartridge body for abutting the second end of the cartridge body when the cap is positioned in the body,
        said cap having a longitudinal recess on the side from which the post extends for receiving one end of a mounting arm, said recess extending from the second end of the cap towards the first end of the cap,
        the second end of the cap including an outwardly facing shoulder on each side of the recess for coacting with shoulders on a mounting arm, and
    a mounting arm including,
        an elongate arm having first and second ends,
        the first end shaped for attachment to a recorder,
        said second end being generally rectangular in cross section and sized for insertion in the recess in the cap, said second end including a notch for engagement with the post, and
        a stop shoulder on each edge spaced from the second end for coaction with the outwardly facing shoulders on the second end of the cap.

2. The apparatus of claim 1 wherein the outer end of the post includes,
    a taper directed inwardly and towards the first end of the cap for aiding in the insertion of the cap into the cartridge body.

3. The apparatus of claim 1 wherein the recess in the cap decreases in thickness toward the first end of the cap to a thickness less than the thickness of the mounting arm whereby the interior of the body is separated from the first end of the cap when the arm is inserted into the recess for providing an air vent to the interior of the body of the cartridge.

4. The apparatus of claim 1 including,
    a second opening in the side of the body opposite the first opening,
    a second post extending outwardly from the cap opposite the first post, and
    said cap having a second longitudinal recess opposite the first recess whereby the cartridge may be mounted to an arm with either recess.

5. An ink pen cartridge for attachment to a mounting arm comprising,
    a hollow body for holding ink,
    a nib adjacent one end of the body and extending from one side of the body,
    a cap insertable into the second end and into the interior of the cartridge body, said cap including a first end shaped and coacting with the interior of the body to normally seal against the inside of the body for holding ink in the body,
    said cap having a second end larger than the interior of the body for abutting the second end of the body when the cap is positioned in the body,
    said cap having a longitudinal recess on one side for receiving the mounting arm, the second end of the cap including an outwardly facing shoulder on each side of the recess for coacting with the mounting arm.

6. The apparatus of claim 5 including,
said cap having a second longitudinal recess on the side opposite the first recess for allowing the mounting arm to selectively engage one of the recesses.

7. The apparatus of claim 5 wherein said recess extends from the second end of the cap toward the first end of the cap and decreases in thickness toward the first end of the cap to a thickness less than the thickness of the mounting arm whereby the interior of the body is separated from the first end of the cap when the arm is inserted into the recess for providing an air vent to the interior of the body of the cartridge.

8. An ink pen cartridge for attachment to a mounting arm having an end with a notch and a stop shoulder on each edge, said cartridge comprising,
a hollow body for holding ink,
a nib adjacent one end of the body,
an opening in the side of the body adjacent to but spaced from the second end of the body,
a cap insertable into the second end and into the interior of the cartridge body, said cap including a first end shaped and coacting with the interior of the body to normally seal against the inside of the body for holding ink in the body,
a post extending outwardly from one side of the cap between the ends of the cap for extending into the body opening for locking the cap in the cartridge body,
said cap having a second end larger than the interior of the cartridge body for abutting the second end of the cartridge body when the cap is positioned in the body,
said cap having a longitudinal recess on the side from which the post extends for receiving said one end of the mounting arm, said recess extending from the second end of the cap towards the first end of the cap,
the second end of the cap including an outwardly facing shoulder on each side of the recess for coacting with shoulders on the mounting arm.

9. The apparatus of claim 8 wherein the outer end of the post includes a taper directed inwardly and towards the first end of the cap for aiding in the insertion of the cap into the cartridge body.

10. The apparatus of claim 8 including
a second opening in the side of the body opposite the first opening,
a second post extending outwardly from the cap opposite the first post, and
said cap having a second longitudinal recess opposite the first recess whereby the cartridge may be mounted to an arm with either recess.

11. The apparatus of claim 8 wherein the recess in the cap decreases in thickness toward the first end of the cap to a thickness less than the thickness of the mounting arm whereby the interior of the body is separated from the first end of the cap when the arm is inserted into the recess for providing an air vent to the interior of the body of the cartridge.

12. The apparatus of claim 11 wherein the post is positioned in the recess and is sized to fill only a portion of said opening whereby the opening provides said air vent.

13. A mounting arm for supporting an ink pen cartridge which has a longitudinal recess in one end, a post positioned in the middle of the recess and a shoulder on either side of said recess at said one end, said arm comprising,
an elongate arm having first and second ends,
the first end shaped for attachment to a recorder,
said second end being generally rectangular in cross section and sized for insertion in the recess in the cartridge, said second end including a notch for engagement with the post, and
a stop shoulder on each edge spaced from the second end for coaction with the shoulder on the end of the cartridge.

14. An ink pen cartridge for attachment to a mounting arm having an end with a notch and a stop shoulder on each edge, said cartridge comprising,
a hollow body for holding ink,
a nib adjacent one end of the body and extending from one side of the body,
an opening in opposite sides of the body adjacent to but spaced from the second end of the body, one of the sides being the one from which the nib extends,
a cap insertable into the second end and into the interior of the cartridge body, said cap including a first end shaped and coacting with the interior of the body to normally seal against the inside of the body for holding ink in the body,
said cap having a second end larger than the interior of the cartridge body for abutting the second end of the cartridge body when the cap is positioned in the body,
said cap having a longitudinal recess on opposite sides for receiving one end of the mounting arm, said recess extending from the second end of the cap toward the first end of the cap and decreasing in thickness from the second end,
a post extending outwardly from each recess of the cap for extending into one of the body openings for locking the cap in the cartridge body said post blocking only part of the openings, said posts positioned to engage the notch on a mounting arm when an arm is inserted into one of the recesses,
the second end of the cap including an outwardly facing shoulder on each side of both recesses for coacting with the shoulders on the mounting arm.

* * * * *